May 27, 1958 — S. C. JORDAN — 2,836,697
ELECTRIC RANGE
Filed Dec. 23, 1955
FIG. 1
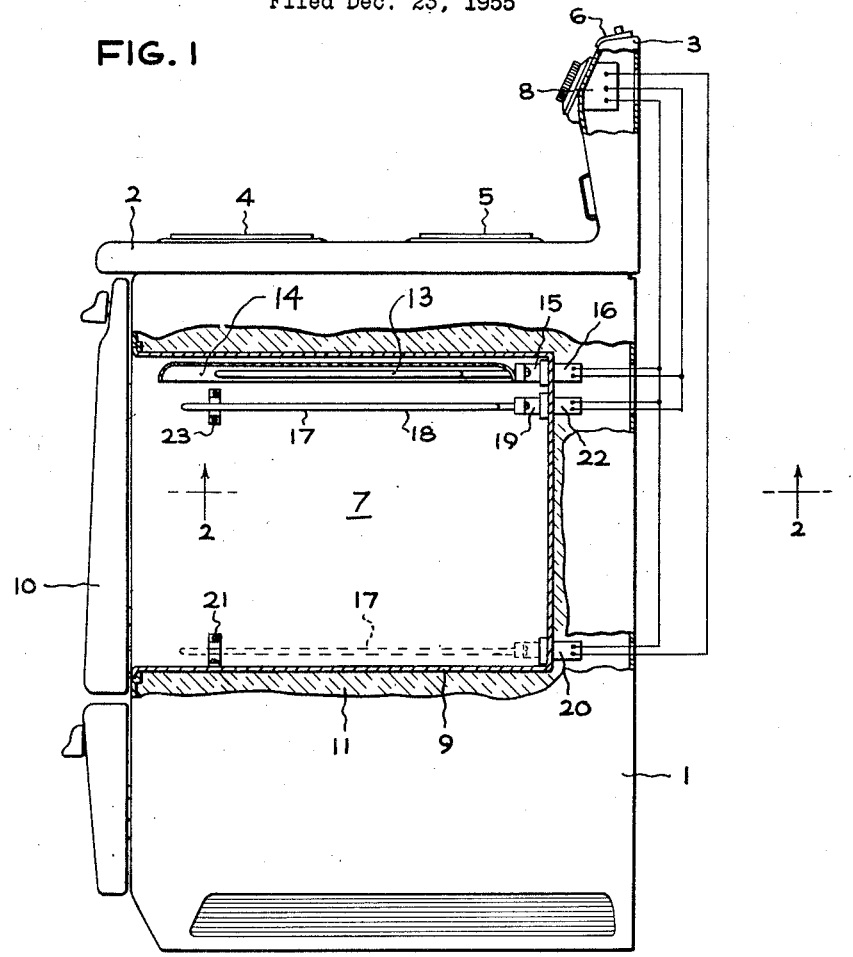
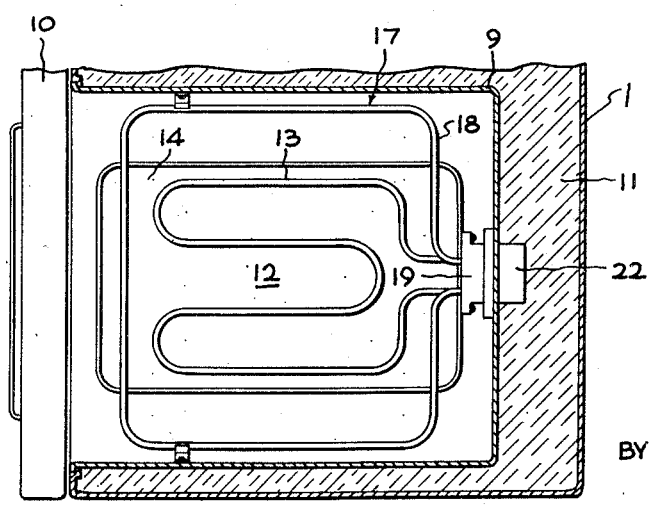
FIG. 2
INVENTOR.
SAMUEL C. JORDAN
BY
HIS ATTORNEY

United States Patent Office 2,836,697
Patented May 27, 1958

2,836,697

ELECTRIC RANGE

Samuel C. Jordan, Lyndon, Ky., assignor to General Electric Company, a corporation of New York Application December 23, 1955, Serial No. 555,220

2 Claims. (Cl. 219—35)

This invention relates to electric ranges, and more particularly to range ovens equipped with electric heating units of the type adapted to provide heat for both baking and broiling operations.

One of the problems involved in oven cooking by means of the broiling method is that various heat intensities are required for properly cooking various foods, one important variable being the thickness of the food. Thus radiant energy of relatively low intensity per unit of exposed surface area is required to properly cook a one-and-one-half inch steak for example, while thin cuts of meat, fish and the like require high intensity radiation. In known ranges now available, this problem is approached by providing spaced supports for the oven racks so that food to be broiled may be placed at various distances from the broiling unit so as to provide the necessary variations in radiation density. However, this approach provides only a relatively narrow range of heat intensity variations, and also to obtain the highest heat intensity it is necessary to place the food very close to the broiling unit so that spattering of grease on the heating element greatly increases the amount of smoke and odors produced.

Accordingly, a principal object of the present invention is to provide an electric range oven in which the range of heating intensities during broiling operations is greatly increased so that both very thick and very thin cuts of meat and other foods may be quickly and satisfactorily broiled without production of objectionable quantities of smoke and odors.

Another object of this invention is to provide a range oven in which an auxiliary broiling unit may be positioned so as to supplement the radiant heat output of the primary broiling unit.

Another object of this invention is to provide a range oven in which the baking unit ordinarily mounted near the bottom of the oven may be removed and mounted adjacent the top of the oven so as to supplement the radiant heat output of the broiling element during broiling operations requiring a high intensity heat.

Further objects and advantages of this invention will become apparent as the following description proceeds, and the features of novelty which characterize my invention will be pointed out with particularity in the claims annexed to and forming a part of this specification.

Briefly stated, in accordance with one aspect of my invention, I provide a range oven including a broiling heating unit in its upper portion primarily adapted to supply heat for broiling operations, a heating unit in the lower portion of the oven primarily adapted to supply heat for baking operations, and means in the upper portion of the oven adapted to support the baking heating unit and to supply energy thereto when that heating unit is transferred to the upper portion of the oven so as to supply supplementary heat for broiling operations.

For a better understanding of my invention reference may be made to the drawing in which:

Fig. 1 is a side elevation view, partly in section, of an electric range embodying my invention.

Fig. 2 is a fragmentary sectional view taken along the line 2—2 in Fig. 1.

Referring to the drawing, the numeral 1 designates an electric range provided with a cooking top 2, a backsplasher 3 along the rear edge of the cooking top, surface heating units 4 and 5, which may be controlled by push button switches such as push button switch 6, and an oven 7 controlled by a thermostat and selector switch assembly 8. It will be evident that the electric range described thus far may be considered to be typical of known electric ranges and that this description is for the purpose of providing a setting for the invention now to be described.

Oven 7 includes an oven liner 9 including top, bottom, rear and side walls of generally rectangular configuration, provided with a door 10 and insulated by suitable heat insulating material 11. Supported in the upper portion of oven 7 adjacent the top wall of lining 9 is an electric heating unit primarily adapted to supply heat for broiling operations, although if desired the energizing circuits may be so arranged that it may be utilized to preheat the oven before a baking operation and to supply a certain amount of top heat during baking operations. Broiling unit 12 includes an electric heating element 13 of the sheathed resistance type having a sinuous configuration, secured to a generally rectangular reflector pan 14 and provided with a terminal block 15 adapted to cooperate with an electrical receptacle 16 mounted in the rear wall of oven liner 9. During normal broiling operations heat is supplied to the food supported on a centrally positioned rack (not shown) the radiant energy preferably being reflected and to some extent concentrated by reflector 14.

To provide heat for baking operations, oven 7 is equipped with a heating unit 17 including a sheathed heating element 18 secured to an electrical plug 19 adapted to cooperate with an electrical receptacle 20 mounted in the rear wall of oven liner 9 adjacent the bottom wall thereof. As best shown in Fig. 2, heating element 18 is formed in a generally rectangular looped configuration and is supported in a slightly raised position above the bottom wall of the oven liner by clips 21 secured to the side walls of the liner. During baking operations, heating unit 17 is periodically energized under the control of thermostat 8 in response to the temperature within oven 7.

In addition to receptacle 20 and clip 21 which support heating unit 17 at the bottom of over 7, I also provide an electric receptacle 22 mounted in the rear wall of oven liner 9 closely adjacent to receptacle 16, and a pair of clips 23 mounted on the side walls of the oven liner so as to support heating unit 17 in a generally horizontal position immediately below broiling unit 12. Thus by providing a second electrical receptacle for heating unit 17 on the rear wall of the oven adjacent the upper wall, and means for supplying current to receptacles 22 and 16 concurrently, the baking unit may be transferred to the upper portion of the oven so as to supply supplementary heat for certain broiling operations. Thus in one electric oven incorporating the present invention, a 3000 watt broiling unit and a 2500 watt baking unit may be located in the upper portion of the oven as shown in Fig. 1 so as to provide a combined broiling unit having a total wattage output of 5,500 watts. With such an arrangement, foods which are best cooked by relatively high intensity radiation, such as thin cuts of meat and fish or the like, may be spaced sufficiently far from heating elements 13 and 18 so that spattering of grease on the heating elements is avoided, thus greatly reducing the production of smoke and odors. Also improved flavor and texture of the food may be obtained by utilizing radiant energy of optimum intensity per unit area of exposed food surface.

Additional electrical receptacle 22 may be electrically connected in any oven control circuit of the type providing separate circuits for the baking unit and the broiling unit, it being only necessary to connect the terminals of receptacle 22 in parallel circuit relation with the terminals of electrical receptacle 16, as shown in Fig. 1. Thus receptacles 16 and 22 are concurrently energized, and if heating unit 17 is transferred from its usual position shown in broken lines in Fig. 1 to its upper position shown in full lines, both it and broiling unit 12 will be energized concurrently and will, in effect, function as a single broiling unit.

Referring to Fig. 2 of the drawing, it will be observed that both heating element 17 of the baking unit and heating unit 13 of the broiling unit are formed in a generally looped configuration lying in a plane substantially parallel to the top wall of oven liner 9. To insure maximum radiant heat output from heating element 13, it is important that it not be obstructed by portions of heating element 17, and hence heating elements 13 and 17 are so formed that substantially all portions of heating element 13 are in vertical misalignment with heating element 17.

From the foregoing description it will be evident that I have provided an improved and inexpensive electric oven in which the baking unit may perform its usual function when located adjacent the bottom of the oven and may also provide supplementary radiant heat for broiling operations when transferred to its upper position and plugged into a receptacle connected in parallel circuit relation with the broiling unit.

While I have shown and described a specific embodiment of my invention, I do not desire my invention to be limited to the particular construction shown and described, and I intend by the appended claims to cover all modifications within the true spirit and scope of my invention.

What I claim is:

1. An electric oven comprising an enclosed oven compartment including top, bottom and rear walls, a first heating unit in the upper portion of said compartment primarily adapted to supply heat for broiling operations, a second heating unit in the lower portion of said compartment primarily adapted to supply heat for baking operations, said first heating unit and said second heating unit each including an elongated resistance heating element formed in a generally looped configuration lying in a plane substantially parallel to said top wall, substantially all heating portions of the heating element of said first heating unit being in vertical mis-alignment with the heating element of said second heating unit, connector means for supplying electrical energy to said first heating unit, a first electrical receptacle for supplying energy to said second heating unit, a second electrical receptacle on said rear wall adjacent said connector means adapted to supply energy to said second heating unit when the second heating unit is transferred to the upper portion of said compartment so as to supply supplementary heat for broiling operations, and a connector plug on said second heating unit adapted to engage said first and said second receptacles, said second receptacle being in parallel circuit relation with said connector means so as to be energized concurrently therewith.

2. An electric oven comprising an enclosed oven compartment including top, bottom and rear walls, a first heating unit in the upper portion of said compartment primarily adapted to supply heat for broiling operations, a second heating unit in the lower portion of said compartment primarily adapted to supply heat for baking operations, said first heating unit including an elongated resistance heating element formed in a sinuous configuration lying in a plane substantially parallel to said top wall, said second heating unit including an elongated resistance element formed in a generally rectangular configuration, substantially all heating portions of the resistance element of said second heating unit being in vertical mis-alignment with the resistance element of said first heating unit, connector means for supplying electrical energy to said first heating unit, a first electrical receptacle for supplying energy to said second heating unit, a second electrical receptacle on said rear wall adjacent said connector means adapted to supply energy to said second heating unit when the second heating unit is transferred to the upper portion of said compartment so as to supply supplementary heat for broiling operations, and a connector plug on said second heating unit adapted to engage said first and second receptacles, said second receptacle being in parallel circuit relation with said connector means so as to be energized concurrently therewith.

References Cited in the file of this patent

UNITED STATES PATENTS

| 1,238,793 | Louth et al. | Sept. 4, 1917 |
| 2,668,222 | McCormick | Feb. 2, 1954 |
| 2,762,899 | Lenz | Sept. 11, 1956 |

FOREIGN PATENTS

| 163,789 | Austria | Aug. 10, 1949 |
| 93,215 | Switzerland | Mar. 1, 1922 |
| 896,833 | Germany | Nov. 16, 1953 |